(12) United States Patent
Roberge et al.

(10) Patent No.: US 7,919,056 B2
(45) Date of Patent: Apr. 5, 2011

(54) MICRO-REACTOR SYSTEM

(75) Inventors: Dominique Roberge, Sierre (CH); Nikolaus Bieler, Brig-Glis (CH); Bertin Zimmermann, Brig-Glis (CH); Rainald Forbert, Flörsheim (DE)

(73) Assignee: Lonza AG, Basel (CH)

( * ) Notice: Subject to any disclaimer, the term of this patent is extended or adjusted under 35 U.S.C. 154(b) by 227 days.

(21) Appl. No.: 12/293,188

(22) PCT Filed: Mar. 29, 2007

(86) PCT No.: PCT/EP2007/002831
§ 371 (c)(1),
(2), (4) Date: Sep. 16, 2008

(87) PCT Pub. No.: WO2007/112945
PCT Pub. Date: Oct. 11, 2007

(65) Prior Publication Data
US 2009/0087359 A1    Apr. 2, 2009

(30) Foreign Application Priority Data

Mar. 31, 2006   (EP) .................................... 06006939
May 9, 2006     (EP) .................................... 06009574

(51) Int. Cl.
*B01J 19/00*   (2006.01)
*B01J 8/00*    (2006.01)
*B01J 10/00*   (2006.01)

(52) U.S. Cl. ......... 422/198; 422/200; 422/130; 422/603

(58) Field of Classification Search .................. 422/198, 422/200, 130, 99
See application file for complete search history.

(56) References Cited

U.S. PATENT DOCUMENTS

| 6,369,893 | B1 | 4/2002 | Christel et al. | |
| 2003/0159530 | A1 | 8/2003 | Haas et al. | |
| 2004/0109798 | A1 | 6/2004 | Chopard et al. | |
| 2004/0156762 | A1* | 8/2004 | Schuppich et al. | 422/191 |
| 2005/0207953 | A1* | 9/2005 | Upadhye et al. | 422/240 |

FOREIGN PATENT DOCUMENTS

| EP | 0688242 | 9/1994 |
| EP | 1 031 375 | 8/2000 |
| GB | 2 333 350 | 7/1999 |
| WO | WO 94/21372 | 9/1994 |
| WO | WO 02/18042 | 3/2002 |
| WO | WO 2004/045761 | 6/2004 |
| WO | WO 2004/103539 | 12/2004 |

* cited by examiner

*Primary Examiner* — Walter D Griffin
*Assistant Examiner* — Lessanework Seifu
(74) *Attorney, Agent, or Firm* — Hoffmann & Baron, LLP

(57) ABSTRACT

A micro-reactor system assembly comprises a stack of at least n process modules (1-6), wherein n is an integer equal to or greater than 1, made from a rigid first material and comprising at least one reactive fluid passage (1A, 1B, 2A, 3A, 6A) for accommodating and guiding a reactive fluid, and at least n+1 heat exchange modules (7, 8) made from a ductile second material other than said first material and comprising at least one heat exchange fluid passage (7A, 8A) for accommodating and guiding a heat exchange fluid, wherein each process module (1-6) is sandwiched between two adjacent heat exchange modules (7, 8).

11 Claims, 9 Drawing Sheets

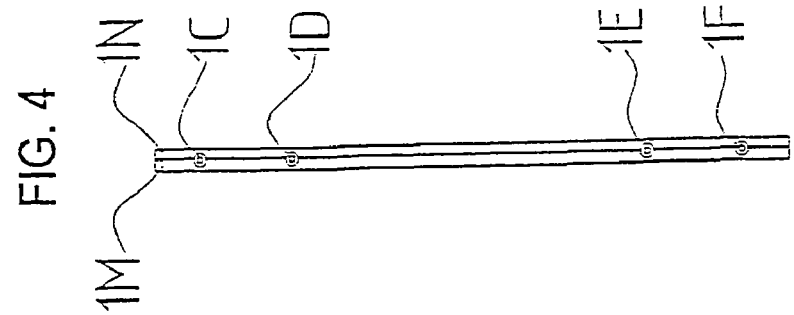
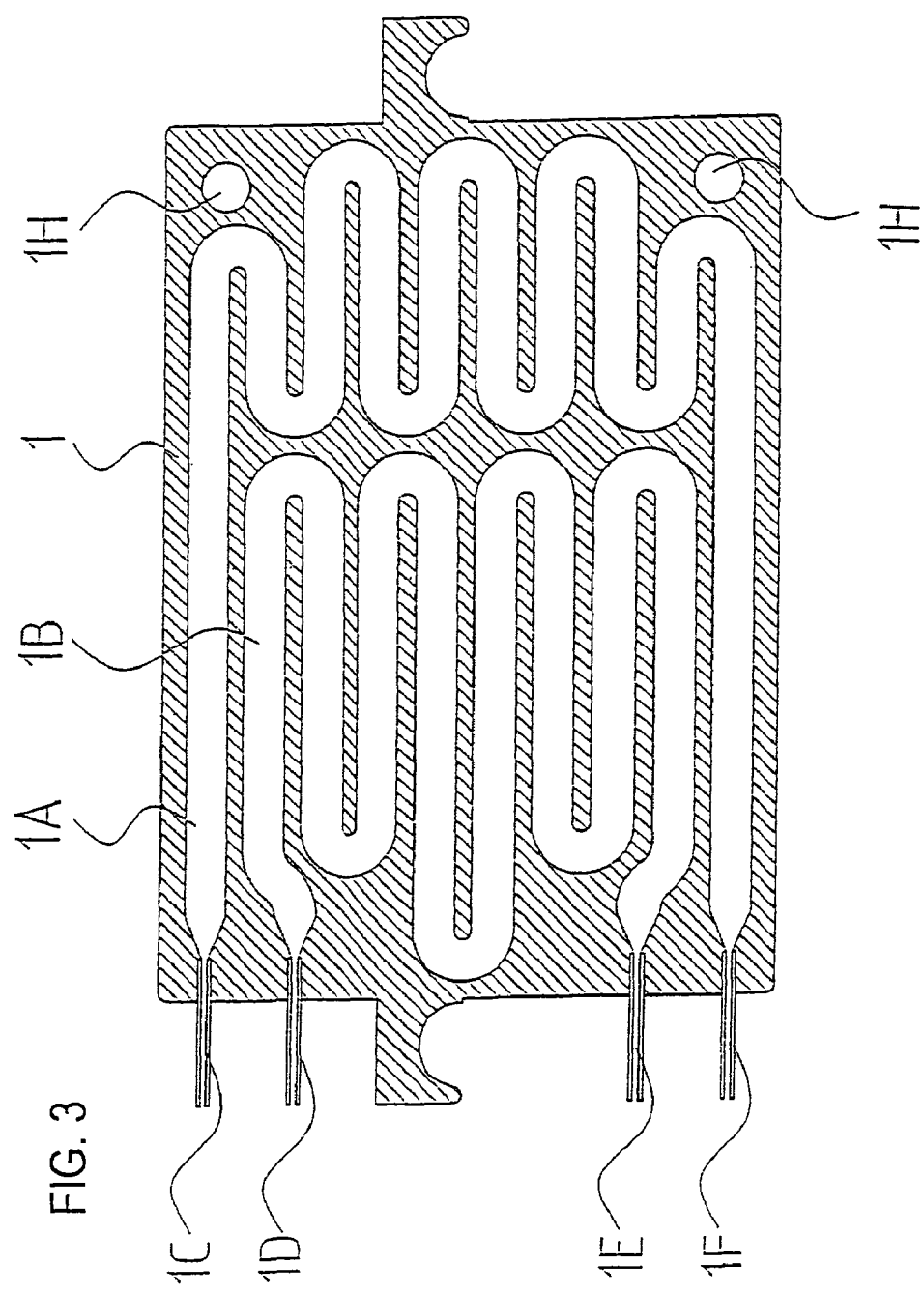

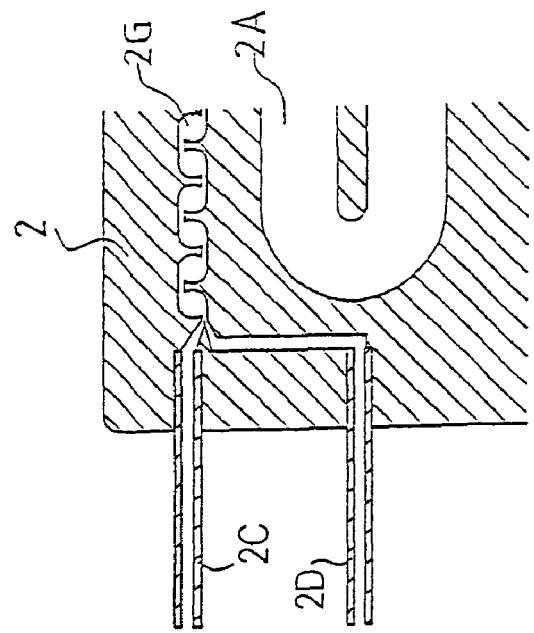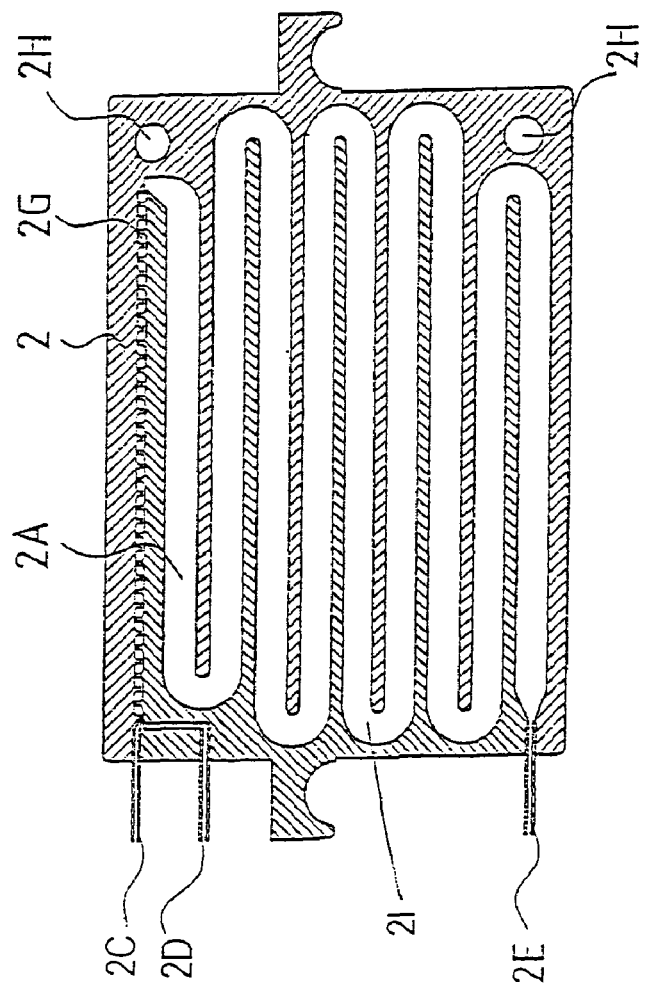

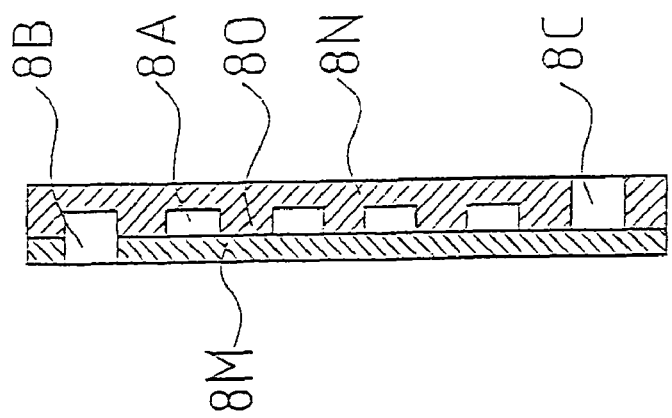
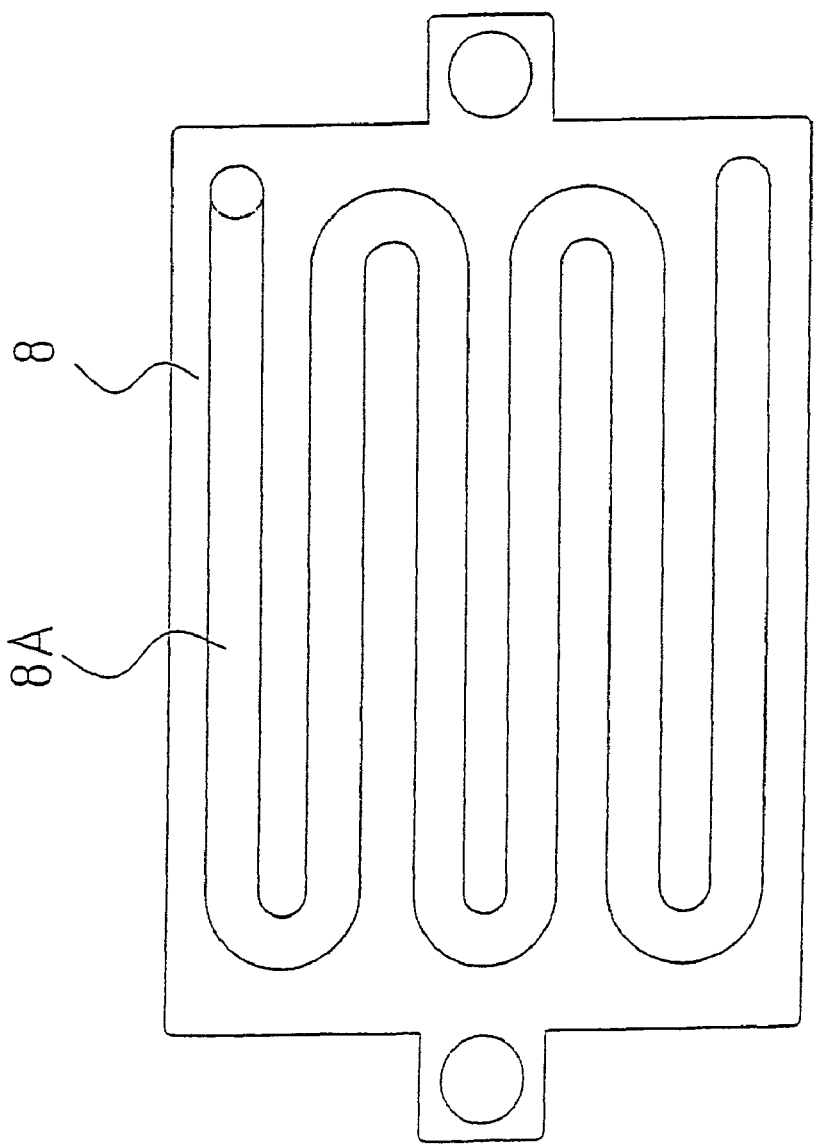

MICRO-REACTOR SYSTEM

This application is the U.S. National Phase of, and Applicants claim priority from, International Application Number PCT/EP2007/002831 filed 29 Mar. 2007, European Application bearing Serial No. 06006939.0 filed 31 Mar. 2006 and European Patent Application bearing Serial No. 06009574.2 filed 9 May 2006, which are incorporated herein by reference.

BACKGROUND OF THE INVENTION

The present invention refers to a micro-reactor system assembly comprising at least n process modules and at least n+1 heat exchange modules wherein each process module is sandwiched by two adjacent heat exchange modules.

Micro-reactors are reaction devices provided for reacting of one or more reactants (typically including mixing of two or more reactants) and to some extent for controlling the reaction of said reactants via heating or cooling or thermal buffering said reactants before, during and/or after mixing. Such micro-reactors for performing chemical reactions within small areas are known for example from EP-A-0688242, EP-A-1031375, WO-A-2004/045761 and US-A-2004/0109798.

Chemical reactions to be performed in micro-reactors can basically be distinguished between so-called type A reactions and type B reactions.

Type A as for example organic metal reactions are very fast chemical reactions and take place directly at mixing reactants within the mixing chamber, typically in the range of 1 sec. They may be called reactions controlled by the mixing process. In order to let all reactants react completely and to avoid by-products, such type A reactions require fast and effective mixing of the process fluids as well as effective thermal control. Such type A reactions generally require none or short after-reaction time and thus can be performed well in micro-reactors with small residence volume or after-reaction volume. The residence time for such reactions typically is in the range less than 20 sec.

Type B reactions as for example Wittig reactions or acetoacylation of an aromatic amine with diktene, on the contrary, are fast to slow reactions with typical reaction times in the range of 1 sec. to 10 min. They run concentration or kinetically controlled. In order to let the reactants react completely and to avoid by-products, such type B reactions do not require a very fast mixing of the reactants but rather controllable reaction conditions during the complete reaction time. Thus residence volume and after-reaction volume must be dimensioned such that the process fluid remains within the micro-reactor for a long time under conditions which can be controlled easily and precisely. However, until now realisation of such longer residence times is difficult with conventional micro-reactors due to the small sizes and the expensive micro-structuring. Thus conventional micro-reactors mostly are used for type A reactions.

It is therefore an object of the present invention to provide an improved micro-reactor system assembly suitable to assure desired residence times during which temperature control is possible.

SUMMARY OF THE INVENTION

This object is solved by a micro-reactor system assembly according to claim 1, comprising a stack of:

at least n process modules (1-6), wherein n is an integer equal to or greater than 1, each process module (1-6) being made from a rigid first material and comprising at least one reactive fluid passage (1A, 1B, 2A, 3A, 6A) which penetrates the interior of said process module (1-6) between at least one reactive fluid inlet port (1C, 1D, 2C, 2D, 3C, 6C) and at least one reactive fluid outlet port (1E, 1F, 2E, 3D, 6D), for accommodating and guiding a reactive fluid, wherein in case of at least two process modules (1-6) said at least two process modules (1-6) are functionally connected in series; and at least n+1 heat exchange modules (7, 8) being made from a deformable or ductile second material other than said first material and comprising at least one heat exchange fluid passage (7A, 8A) which penetrates the interior of said heat exchange module (7, 8) between at least one heat exchange fluid inlet port (7B, 8B) and at least one heat exchange fluid-outlet port (7C, 8C), for accommodating and guiding a heat exchange fluid, wherein said at least n+1 heat exchange modules (7, 8) are functionally connected in series, wherein each process module (1-6) is sandwiched between two adjacent heat exchange modules (7, 8).

The at least n process modules and the at least n+1 heat exchange modules form each an independent module which defines at least one fluid passage, i.e. reactive fluid passage or heat exchange fluid passage, extending completely within the interior of the module between the at least one inlet port and the at least one outlet port.

By providing process modules and heat exchange modules made from different materials, it is possible to select the following first and second materials for the process modules and heat exchange modules, respectively:

For the process modules, a first material can be selected which is optimal for the reactions of the reactants, in particular resistant to corrosion and/or pressure and preferably selected from the group including stainless steel, hastelloy, tungsten, tantalum, titanium, ceramics, silicon, graphite and/or a suitable combination of one or more of said first materials.

For the heat exchange modules, a ductile second material can be selected which is optimal for heat transfer and/or sealing, in particular heat conducting, and preferably is selected from the group from the group including aluminum, aluminum alloys, copper, copper alloys, silver and silver alloys and/or a suitable combination of one or more of said second materials.

Thus by providing a micro-reactor system assembly with separate process and heat exchange modules, it becomes possible to optimise each of said modules for its specific duty, i.e. running the chemical reaction or controlling the temperature of the process.

Advantageously, providing separate modules for the chemical reaction process and the temperature control, respectively allows to standardise the components of the micro-reactor system assembly. Thus, it becomes possible to provide different micro-reactor system assemblies for different reactions with different residence times, different fluid volumes, different amounts of heat to be transferred and the like. For example, providing heat exchange modules with larger passages for accommodating heat exchange fluid allows to supply or remove larger amounts of heat to the same process module.

While the first material is a more rigid one, the second material is a more ductile one. Preferably the ductile second material for the heat exchange modules reversibly, i.e. elastically, or remainingly, i.e. plastically, deforms under pressure. Pressing heat exchange modules onto an adjacent process module made from the more rigid first material like stainless steel or the like then slightly deforms the contacting surface of the heat exchange module such that no additional sealing between process module and heat exchange module is required.

In contrast to conventional micro-reactors where wall thickness between process fluids and heat exchange fluids has been reduced as far as possible in order to provide good heat transfer, according to the present invention independent process modules and heat exchange modules are provided. Although this increases the distance between the reactive fluids and the heat exchange fluid(s)—which has been noticed as disadvantageously heretofore—due to optimising the separate modules with respect to their specific duty surprisingly better process and temperature control can be reached.

Each process module is sandwiched between two heat exchange modules and each heat exchange module, which is not placed at an end of the micro-reactor, is sandwiched between two process modules. The heat exchange modules at the ends of the micro-reactor system assembly may be placed between a first and second frame means, respectively, and a process module.

According to a preferred embodiment of the micro-reactor system assembly, said at least n process modules comprise:

a mixing module the at least one reactive fluid passage of which comprising a mixing portion for receiving and mixing at least two reactive fluids; and optionally at least one thermal adjusting module disposed upstream of said mixing module for adjusting a temperature of said reactive fluids prior to entering said mixing module; and at least one retention modules disposed downstream of the mixing module for accommodating the reactive fluid mixture.

Using more than one mixing module allows to sequentially introduce more reactive fluids for sequential reaction steps. In said mixing module the reactive fluids are mixed in a mixing portion which forms part of the at least one reactive fluid passage and, after leaving said mixing portion, are accommodated in a first retention volume also forming part of the at least one reactive fluid passage. Said mixing portion may have a mixing structure like plug flow mixing or back mixing, while said first retention volume may comprise one or more substantially straight passages connected by elbows. Preferably the first retention volume is provided such that a laminar flow yields.

The temperature of the reactive fluids in the mixing modules can be controlled by the two heat exchange modules adjacent to said mixing module. Thereto a warm or cold heat exchange fluid is supplied to the at least one heat exchange fluid passage within each of the two heat exchange modules, which supplies or removes heat from the process module by heat transfer.

As indicated above before mixing of two or more reactive fluids, said reactive fluids may be heated or cooled. Thereto one or more thermal adjusting modules may be provided upstream of said mixing module. Said thermal adjusting module comprises at least one reactive fluid passage for each reactive fluid to be heated or cooled. While flowing through said reactive fluid passage(s) each reactive fluid is heated or cooled by the two heat exchange modules adjacent to said thermal adjusting module as it has been described before for the mixing module. By providing different passage volumes it becomes possible to heat or cool the different reactants differently.

After having left the mixing module the mixed reactive fluids may be accommodated in one or more retention modules. Thereto the reactive fluid mixture leaving the mixing module enters at least one reactive fluid passage within the retention module, flows through said at least one reactive fluid passage and leaves the retention module afterwards. During flowing through said at least one reactive fluid passage, said reactive fluid mixture can be heated, cooled or thermally buffered by the two heat exchange modules adjacent to each retention module in the same way as described for the mixing and thermal changing module before. By providing different retention modules with differently formed reactive fluid passages it becomes possible to obtain different retention conditions. It also is possible to provide two or more retention modules communicating with one another, each retention module being sandwiched between heat exchange modules, so that a large retention volume and thereby (depending on velocity of flow) retention time (residence time) can be obtained while the conditions, in particular the temperature of the reactive fluid mixture during residence time can be controlled easily and precisely.

Preferably the process module's reactive fluid passage for accommodating and guiding a reactive fluid comprises a flat channel. Ideally, the flow path of a micro-reactor is a narrow pipe whose diameter usually is less than 1 mm. If a laminar non-turbulent flow is required, however, the flow rate is restricted by said small section. To increase the flow rate, a plurality of such narrow pipes may be provided. But thereto the stoichiometry in all pipes must be controllable and the residence time must be held equal for all pipes, which cannot be secured sufficiently in real systems.

The flat channel suggested as a preferred embodiment, corresponds to a combination of parallel pipes. Thus the flow rate can be increased significantly while a laminar non-turbulent flow is maintained.

It has turned out that a ratio width:height in the range of 1:4 to 1:50 is suitable to yield good results. Preferably said width/height ratio is set in the range of 1:4 to 1:30. Even more preferably said width/height ratio is set in the range of 1:5 to 1:25. In exemplary embodiments a width of 2.0 mm, a height of 10 mm and a length of 1844 mm was selected for the flat channel which yields a width/height ratio of 1:5. In other embodiments the width already tested was chosen as 1.4 mm, 0.9 mm and 0.5 mm respectively, yielding a width/height ratio of 1:7.14, 1:11.11 and 1:20 respectively.

Due to the small width of the channel a mostly laminar flow of the process fluids as in single pipes could be maintained while at the same time the flow rate (volume of process fluid per time) has been increased. Also only the stoichiometry of one single volume must be controlled in the preferred embodiment.

With a flow rate of 100 ml/min residence times of 5.7, 10.2, 15.9 and 22.6 sec respectively have been measured for the channels identified before, i.e. with widths of 2.0 mm, 1.4 mm, 0.9 mm and 0.5 mm respectively. As can be seen from these measurements the residence time for a specific micro reaction can be chosen nearly arbitrarily by combining different modules with different residence times. In particular residence times up to 30 min, or preferably up to 20 min and most preferably up to 10 min can be obtained.

In a preferred embodiment the micro-reactor system assembly comprises at least two process modules connected in series, each being sandwiched by two adjacent heat exchange modules. For example, one or more mixing modules may be combined with at least one preceding thermal adjusting module for bringing the reactive fluids to an optimal temperature before mixing, and/or at least one retention module for providing required residence times for the reactive fluid mixture(s). During mixing and retention the temperature of the reactive fluid mixture(s) can be controlled by the heat exchange modules being disposed adjacent to each mixing and retention module. An additional mixing module, optionally accompanied with a preceding thermal adjusting module may be integrated between two retention modules to allow the implementation of a subsequent reaction by feeding further reactive fluids.

The reactive fluid passages of two subsequent process modules may be externally connected. Thereto external detachable or fixed couplings such as pipes, fittings, etc. may be used. In particular tube pipes may be soldered or welded to the modules or Swagelok quick fitting couplings may be used. While detachable external couplings allow easy re-use of the single modules and thereby increases flexibility, fixed tube pipes advantageously avoid dead volume and can additionally increase stability of the complete micro-reactor system assembly.

Preferably the at least one heat exchange fluid passage within a heat exchange module comprises at least one heat exchange fluid inlet port communicating with a first heat exchange fluid reservoir or at least one heat exchange fluid connection passage provided in an adjacent process module and at least one heat exchange fluid outlet port communicating with a second heat exchange fluid reservoir or a heat exchange fluid connection passage provided in an adjacent process module. Thus two heat exchange modules sandwiching one process module can communicate via the at least one heat exchange fluid connection passage provided in the process module with one another. Advantageously no additional heat exchange fluid connections between said two heat exchange modules are necessary.

If said heat exchange modules are made from a ductile material and are pressed against the process module, no additional sealing is required at the interfaces of the at least one heat exchange fluid connection passages through the process module, connecting two neighbouring heat exchange modules due to slight plastic or elastic deformation of the contacting surfaces of the heat exchange modules. In another preferred embodiment, however, additional sealings may be provided at the interfaces of heat exchange fluid inlet ports and/or heat exchange fluid outlet ports, additionally sealing heat exchange fluid connection interfaces between two subsequent heat exchange modules via the at least one heat exchange fluid connection passage through the sandwiched process module. Such sealing preferably may be an annular sealing. In particular it may be a hard sealing made from Teflon or the like. Due to the ductile material of the heat exchange modules it is possible to use hard sealings, thus avoiding elastic sealings like rubber or silicon which may embrittle.

The at least one heat exchange fluid passage of a heat exchange module accommodating the heat exchange fluid may be such that a (high) turbulent flow of said heat exchange fluid yields which advantageously increases heat transfer from an heat exchange module to the adjacent process modules. Preferably a Reynold's number equal or more than 2600 is realised.

In a preferred embodiment a process module is made by joining a first plate and a second plate with one another. Within the contacting surface of said first and/second plate the at least one reactive fluid passage for accommodating at least one reactive fluid can be provided by milling, etching or the like. Preferably said at least one reactive fluid passage is a micro structure. After joining said first and second plate with one another by soldering, sintering, welding or the like the at least one reactive fluid passage for accommodating the reactive fluid is, except for the at least one reactive fluid inlet port and the at least one reactive fluid outlet port, completely encased within the process module.

A heat exchange module may be manufactured similarly by providing at least one heat exchange fluid passage for accommodating at least one heat exchange fluid within one or both contacting surfaces of a first and second plate to be joined together afterwards by soldering, welding or the like. Alternatively, an intermediate plate may be sandwiched between said first and second plate, said intermediate plate comprising one or more cut-outs. After joining said first, intermediate and second plate with one another said cut-outs and the corresponding surfaces of said first and second plate define at least one heat exchange fluid passage for accommodating at least one heat exchange fluid.

The combination of externally connected process modules and internally connected heat exchange modules provide the best mode for separation of the at least one reactive fluid circuit and the at least one heat exchange fluid circuit and avoiding of cross contamination.

In a preferred embodiment the stack of process modules and heat exchange modules are pressed against each other by at least a first and second frame means. Thereto said first and second frame means may be pushed towards one another, thereby pressing the process modules and heat exchange modules in between them against each other, by one or more tension anchors or tie-rods.

In a preferred embodiment each of said frame means optionally comprises an inner and an outer frame. In a further preferred embodiment according to FIG. 17 one frame means consists of one structural element and the second frame means consists of an outer and an inner frame, wherein the first frame means is directly anchored to the outer frame via tie-rods and said outer frame pushes said inner frame against the first frame means and the stack of modules lying inbetween.

Said tie-rods may be provided in the centre and/or the periphery of the micro-reactor system assembly. Thus said modular micro-reactor system assembly can be assembled easily with different numbers of modules.

Advantageously, a cavity is provided within the central area of the first and second frame means such that at pushing said first and second frame means towards each other a higher pressure is obtained at a circumferential portion of the modules. This advantageously increases sealing characteristics of the micro-reactor.

In a most preferred embodiment one heat exchange module serves as an adjacent module for two subsequent process modules, i.e. in the micro-reactor system assembly, there are provided heat exchange modules and process modules alternatingly. Advantageously this stack starts and ends with a heat exchange module. If two subsequent heat exchange modules communicate with one another via a heat exchange fluid connection passage provided in a process module sandwiched in between, identically structured heat exchange modules may be used, wherein each second module is rotated around 180° (180° rotation around a vertical axis if it is assumed that the heat exchange fluid flows from right to left direction), so that the at least one outlet port of the first heat exchange module, the at least one heat exchange fluid connection passage provided in the adjacent process module and the at least one heat exchange fluid inlet port of the subsequent second heat exchange module align with one another.

The at least one heat exchange fluid inlet port of a very first heat exchange module and the at least one heat exchange fluid outlet port of a very last heat exchange module of the complete micro-reactor system assembly can communicate with a first and second heat exchange fluid reservoir, respectively, such that the heat exchange fluid flows from the first to the second reservoir or vice versa, thereby heating, cooling or thermal buffering the process modules of the micro-reactor system assembly. Thereto an inlet port and an outlet port respectively may be provided in the first and second frame means abutting the first and last heat exchange modules.

Additional heat exchange fluid inlet ports and heat exchange fluid outlet ports may be provided at heat exchange modules within the micro-reactor, communicating with a third, fourth etc. heat exchange fluid reservoir. Thus for example a warm first heat exchange fluid may flow from the first reservoir through the heat exchange modules sandwiching the thermal adjusting module into a third reservoir, thus heating up the reactant flowing through the thermal adjusting module. A second, cold heat exchange fluid then may flow from a fourth reservoir through the heat exchange modules sandwiching the retention modules into the second reservoir, thereby cooling the process fluids during residence time.

As described above, in a preferred embodiment subsequent heat exchange modules are substantially identical, wherein each second module is rotated around 180°, so that the at least one heat exchange fluid outlet port of the first heat exchange module, the at least one heat exchange fluid connection passage provided in the adjacent process module and the at least one heat exchange fluid inlet port of the adjacent second heat exchange module communicate with one another. Thus the heat exchange fluid flows in a zigzag line through the micro-reactor. Depending on the number of process and heat exchange modules it may become necessary to provide two heat exchange modules adjacent to one another in order to fit to the inlet and outlet ports of the complete micro-reactor. To avoid said two adjacent heat exchange modules they may be separated by installation of one blind module. Alternatively, for example, the second frame means, in which the outlet port of the micro-reactor can be provided, may be rotated around 180° (180° rotation around a horizontal axis assumed the thermal heat exchange fluid flows from right to left direction) to match the last heat exchange module's outlet port. Alternatively, for example, a second frame means with a shifted inlet port may be used.

BRIEF DESCRIPTION OF THE DRAWINGS

Further objects, advantages and features may be derived from the depending claims and the described embodiments of the present invention. Thereto:

FIG. 3 shows a frontal sectional view of a thermal adjusting module of the micro-reactor system assembly shown in FIG. 1;

FIG. 4 shows the thermal adjusting module of FIG. 3, seen from the left;

FIG. 5 shows a frontal sectional view of a mixing module of the micro-reactor system assembly shown in FIG. 1;

FIG. 6 shows an enlarged view of an upper left corner indicated "X" in FIG. 5;

FIG. 15 shows a frontal sectional view of a second heat exchange module;

FIG. 16 shows a side sectional view of the heat exchange module of FIG. 15; and

DETAILED DESCRIPTION OF THE INVENTION

Figure 1:
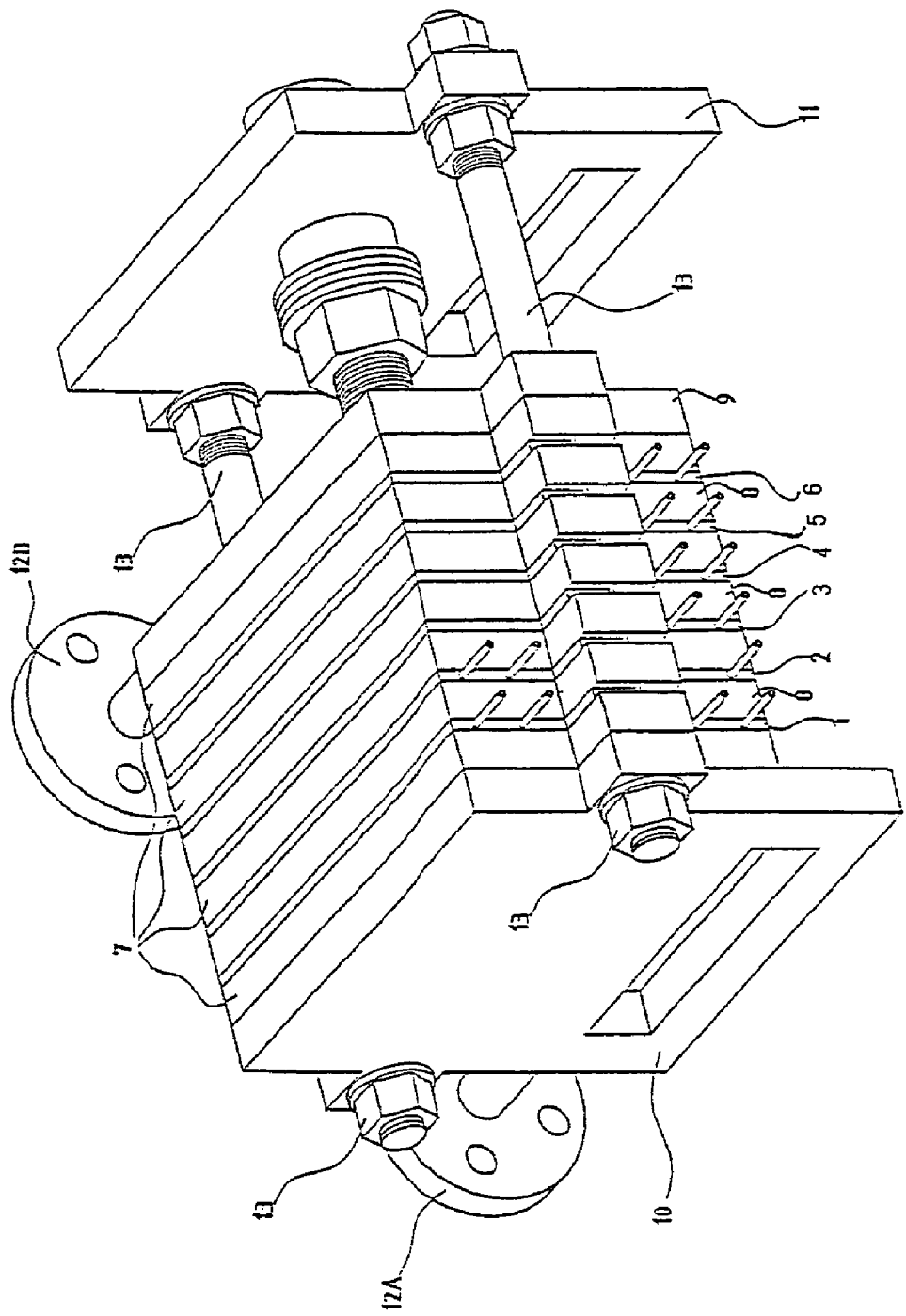
FIG. 1 shows a spatial view of a micro-reactor system assembly having all fittings on one side according to one embodiment of the present invention.
Figure 2:
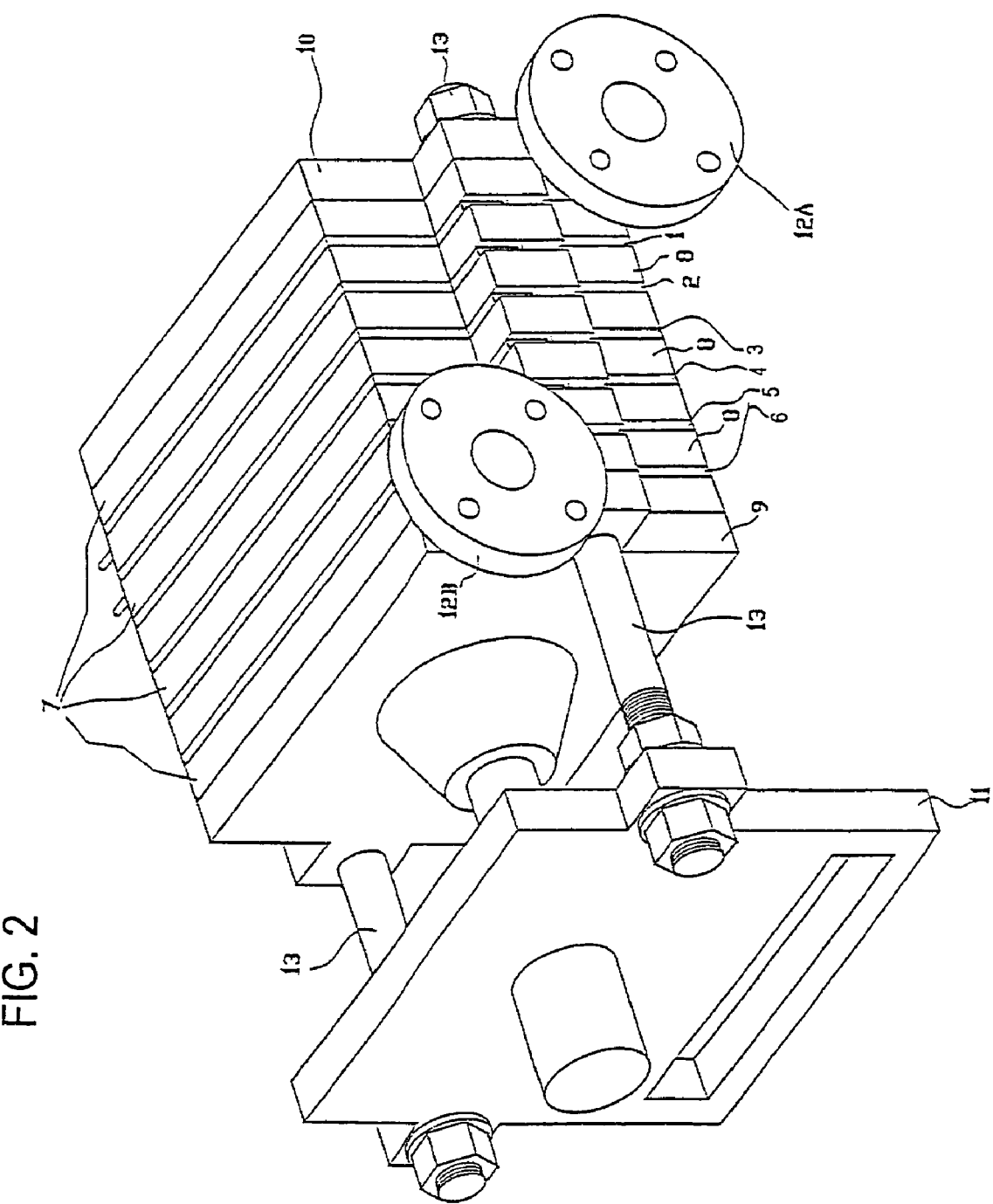
FIG. 2 shows a spatial view rotated 180° of the micro-reactor system assembly shown in FIG. 1.

The micro-reactor system assembly according to one embodiment of the present invention as shown in FIGS. 1, 2 comprises a first frame means 10, a first heat exchange module 7, a thermal adjusting module 1 as a process module, a second heat exchange module 8, a mixing module 2 as a further process module, another first heat exchange module 7, a retention module 3 as a further process module, another second heat exchange module 8, further retention modules 4, 5 and 6 respectively, each sandwiched between two heat exchange modules 7, 8 and a second frame means 9 in this sequence. Thus, between said first and second frame means 10, 9 alternating a first or second heat exchange module 7, 8 and a process module 1-6 are provided.

Figure 14:
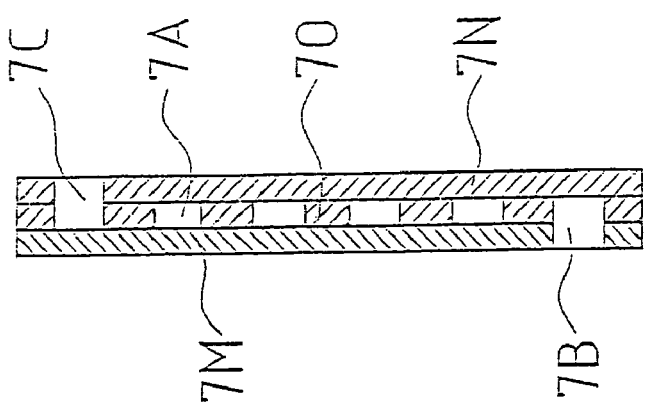
FIG. 14 shows a side sectional view of the heat exchange module of FIG. 13.
Figure 13:
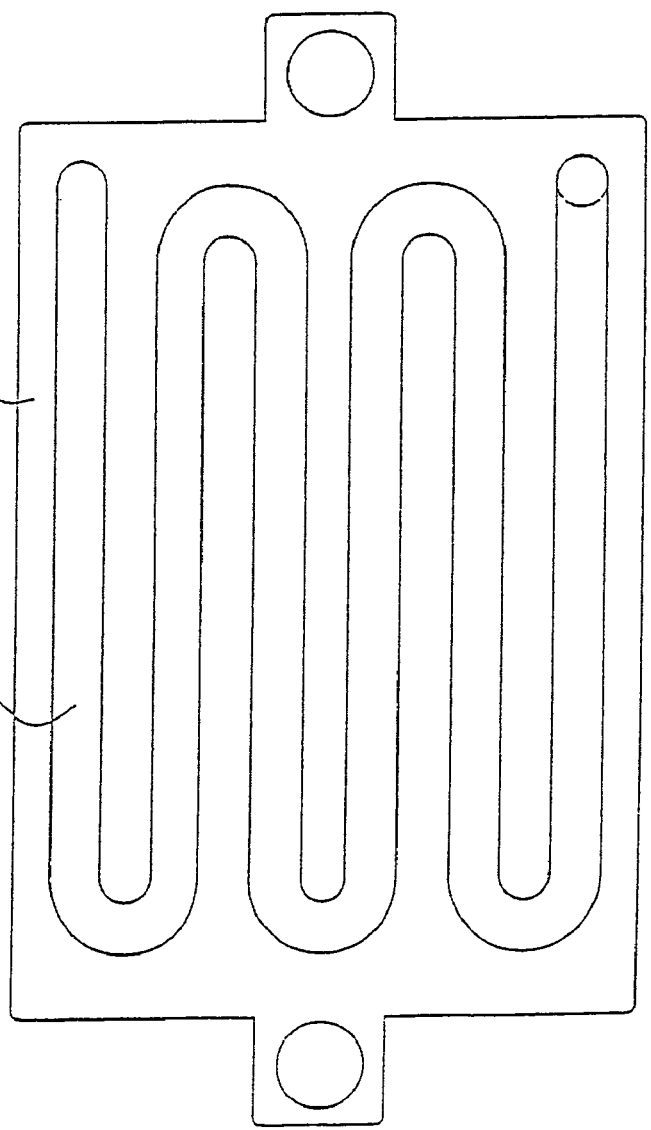
FIG. 13 shows a frontal sectional view of a first heat exchange module.

As can be seen best from FIGS. 14, 16, each heat exchange module 7, 8, comprises a first plate 7M, 8M, an intermediate plate 70, 80 and a second plate 7N, 8N respectively, joined together by soldering. The intermediate plate comprises a cut-out in the form of parallel straight passages, wherein two subsequent passages are connected by a half circle such that one continuous sinusoidal cut-out is formed. Said cut-out of the intermediate plate 70, 80 and the inner surfaces of the first and second plate 7M, 7N and 8M, 8N respectively thus define a heat exchange fluid passage 7A, 8A for accommodating a heat exchange fluid in the heat exchange module 7, 8. At one end of the cut-out a through hole is formed in the first plate 7M, 8M, and another through hole is formed at the opposite end of the cut-out in the second plate 7N, 8N to define a heat exchange fluid inlet port 7B, 8B and a heat exchange fluid outlet port 7C, 8C respectively, communicating with the heat exchange fluid passage 7A, 8A.

As can be seen from FIGS. 13-16, the first and second heat exchange modules 7, 8 are substantially identical, wherein the second heat exchange module 8 is rotated around 180°. Thus, when assembled, the outlet port 7C of a first heat exchange module 7 and the heat exchange fluid inlet port 8B of a second heat exchange module 8 align with each other as well as the heat exchange fluid outlet port 8C of the second heat exchange module 8 with the inlet port 7B of a next first heat exchange module 7.

Figure 17:
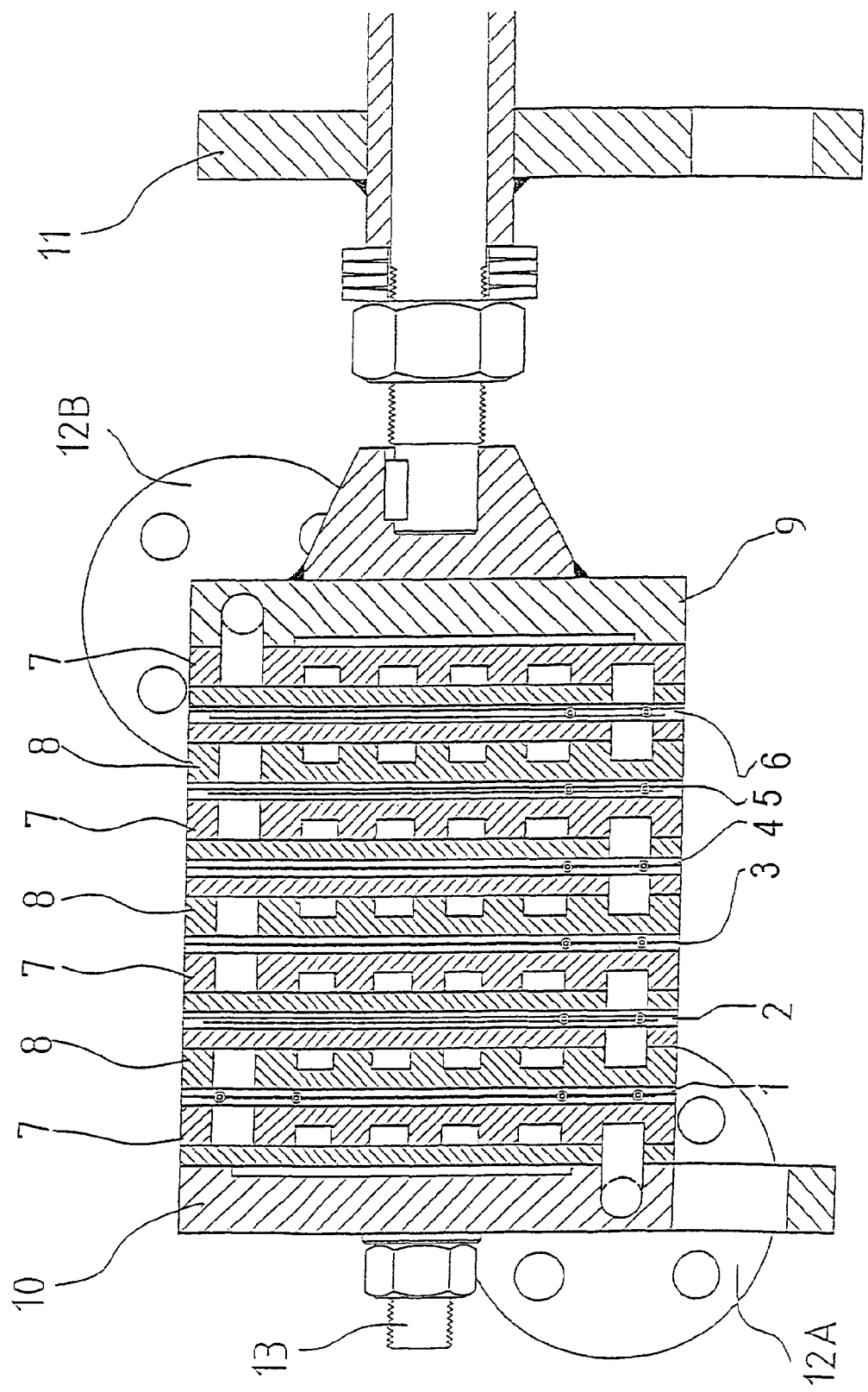
FIG. 17 shows a longitudinal section of a micro-reactor system assembly according to one embodiment of the present invention.

As can be seen from FIGS. 3, 5, 7 and 10, each process module 1-3, 6 comprises two through holes 1H-3H, 6H, one of which, when assembled, corresponds with a heat exchange fluid inlet port 7B, 8B while the other of which corresponds with a heat exchange fluid outlet port 7C, 8C of first and second heat exchange modules 7, 8 sandwiching said each process module 1-3, 6. Thus the heat exchange fluid passage 7A, 8A for accommodating and guiding a heat exchange fluid in a first heat exchange module 7 and in a second heat exchange module 8 communicate with one another via a heat exchange fluid connection passage formed by through holes in a corresponding one of process modules 1-6 sandwiched between said first heat exchange module 7 and second heat exchange module 8, when assembled, as can be seen from FIGS. 1, 2 and 17.

The heat exchange fluid inlet port 7B of the very first heat exchange module 7 communicates with a first heat exchange fluid reservoir (not shown) through a passage provided in the first frame means 10 and a first coupling part 12A connected thereto. The heat exchange fluid outlet port 8C of the last heat exchange module 8 communicates with a second heat exchange fluid reservoir (not shown) via a passage provided in the second frame means 9 and a second coupling part 12B connected thereto. Thus for example a warm heat exchange fluid can flow from the first reservoir through the first coupling part 12A, the first frame 10, groups of first and second heat exchange modules 7, 8 communicating via heat exchange fluid connection passages provided in process modules 1-6 sandwiched by said first and second heat exchange module 7, 8, second frame 9 and second coupling part 12B into a second reservoir in a zigzag line, thereby subsequently heating all process modules 1-6 via heat exchange through the module plates.

A temperature adjusting module 1, which is shown in further detail in FIGS. 3, 4 is provided as a first process module. Said temperature adjusting module 1 comprises a first reactive fluid passage 1A, communicating with a first reactive fluid inlet port 1C and a first reactive fluid outlet port 1F, and a second reactive fluid passage 1B communicating with a second reactive fluid inlet port 1D and a second reactive fluid outlet port 1E. A first reactive fluid is supplied to the first reactive fluid passage 1A through the first reactive fluid inlet port 1C. A second reactive fluid is supplied to the second reactive fluid passage 1B through the second reactive fluid inlet port 1D.

Said temperature adjusting module 1 comprises a first and second plate 1M, 1N (FIG. 4), which are joined with one another by soldering or the like. Into the contacting surfaces of the first and/or second plate 1M, 1N the sinusoidal reactive fluid passages 1A, 1B are cut by etching, milling or the like.

While flowing through said first reactive fluid passage 1A toward said first reactive fluid outlet port 1F, said first reactive fluid's temperature is adjusted by the two heat exchange modules 7, 8 sandwiching said temperature adjusting module 1. Thereto the heat exchange fluid flowing through said heat exchange modules 7, 8 supplies or removes heat to said first reactive fluid by heat conduction through the plates 7N, 8M of the heat exchange modules contacting the plates 1M, 1N of said temperature adjusting module.

A mixing module 2 as a second process module is shown in FIGS. 5, 6. Although not shown in detail, said mixing module 2 comprises a first and second plate similar to the temperature adjusting module 1 described above. In said mixing module a reactive fluid passage 2A is provided comprising a mixing section 2G and a first retention section 2I.

A first reactive fluid inlet port 2C communicating with said reactive-fluid passage 2A is connected with the first reactive fluid outlet port 1F of the temperature adjusting module 1 by an external connection (not shown). A second reactive fluid inlet port 2D also communicating with the reactive fluid passage 2A, is connected with the second reactive fluid outlet port 1E of the temperature adjusting module 1 similarly. Thus, the first and second reactive fluids respectively, after having passed through said temperature adjusting module 1, flow into the mixing section 2G of the passage 2A within the mixing module 2, wherein said both reactive fluids are mixed with one another. The geometry of the mixing section 2G, as shown in enlarged view in FIG. 6, can be chosen appropriately to mix the reactive fluids in an optimal way. After being mixed, the resulting process fluid flows into the first retention section 2I of the reactive fluid passage 2A which basically is formed as a flat channel, thus providing an substantially laminar flow of the process fluids.

It shall be emphasised that the geometry of the passages of the process and heat exchange modules 1-6, 7, 8 are not limited to the ones shown in the figures and described with respect to preferred embodiments, but may be chosen in any appropriate design.

During mixing and residence within the mixing section 2G and first retention section 2I, the chemical reaction can be temperature controlled by the two heat exchange modules 8, 7 sandwiching said mixing module 2.

Figure 7:
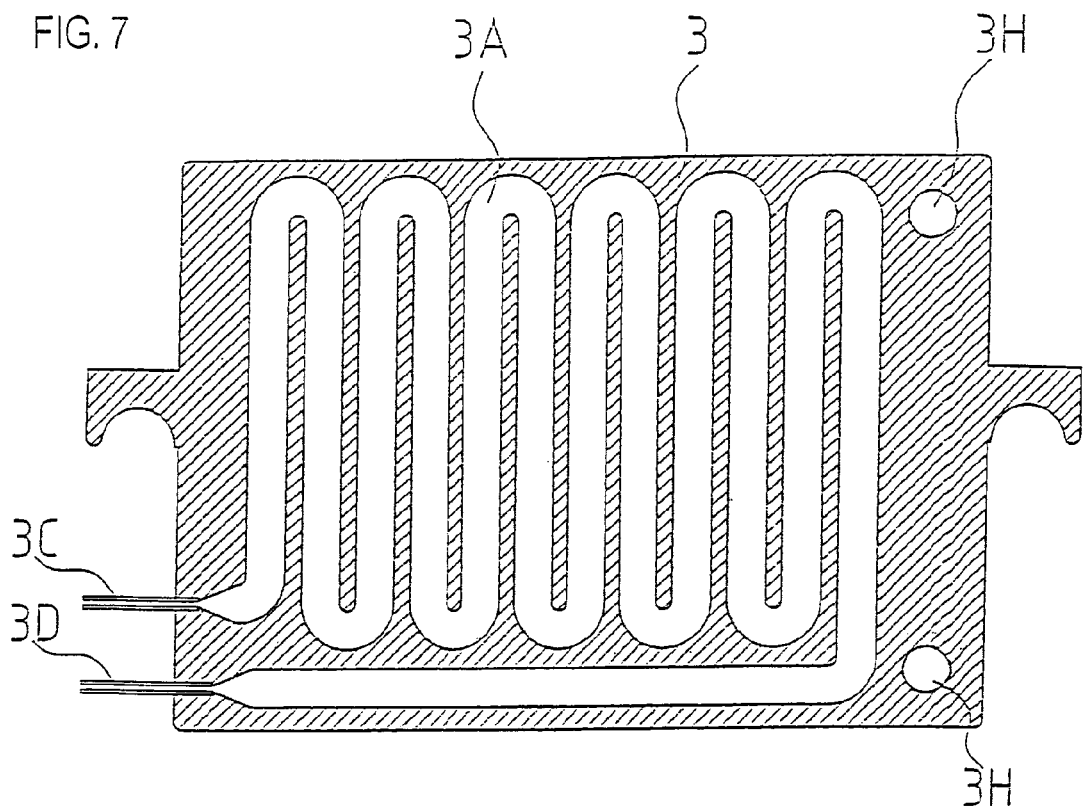
FIG. 7 shows a frontal sectional view of a retention module of the micro-reactor system assembly in FIG. 1.
Figure 8:
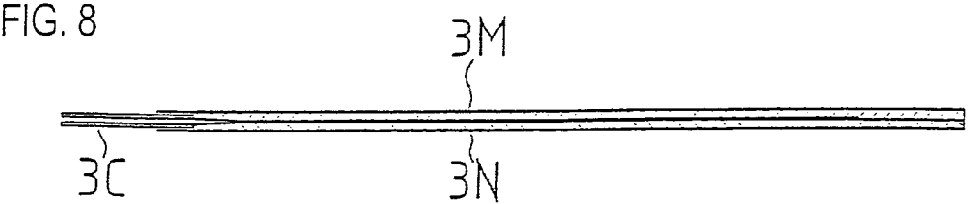
FIG. 8 shows a top sectional view of the mixing module of FIG. 7 seen from above.
Figure 9:
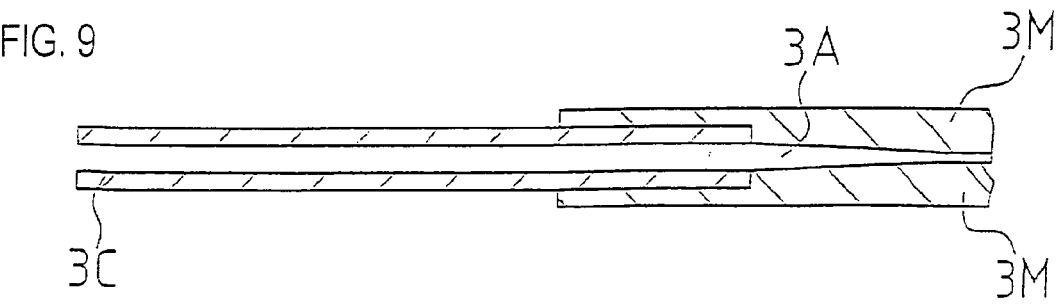
FIG. 9 shows an enlarged view of a reactive fluid inlet port of the mixing module shown in FIG. 8.
Figure 10:
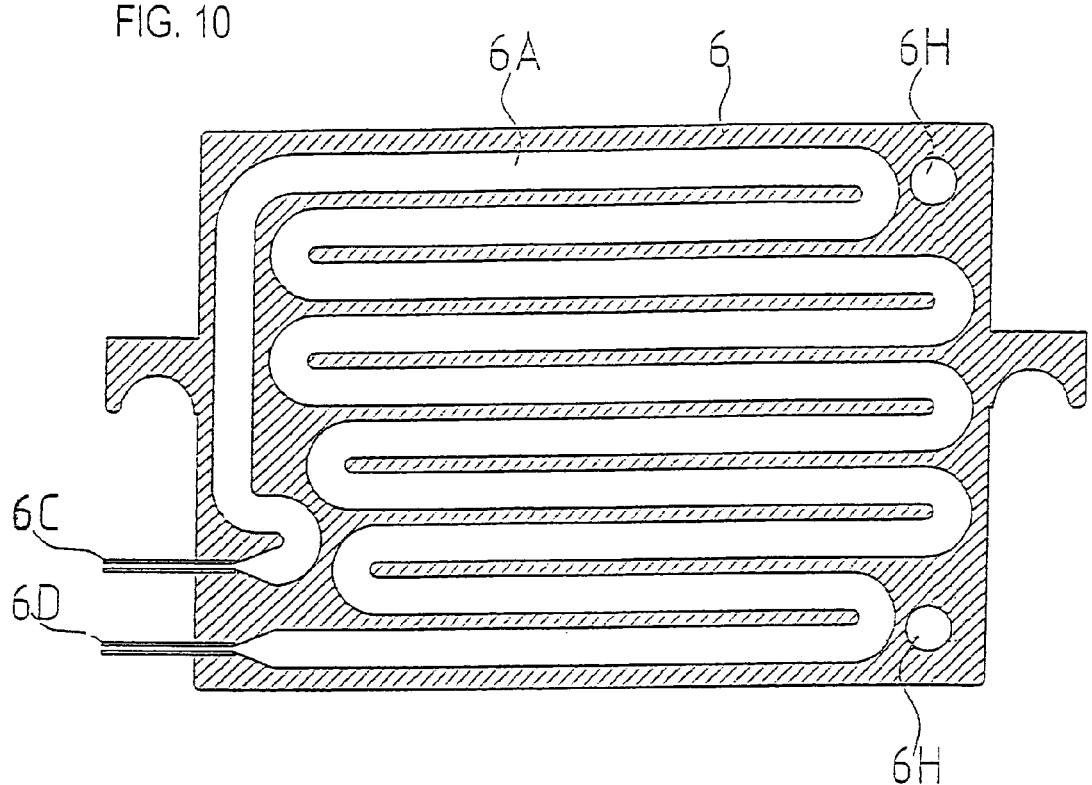
FIG. 10 shows a frontal sectional view of another retention module of the micro-reactor in FIG. 1.
Figure 11:
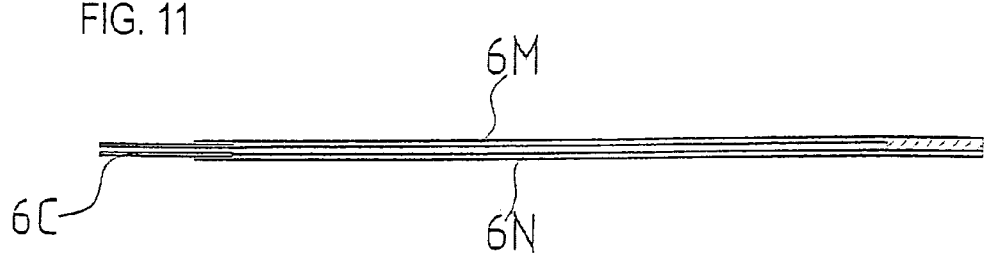
FIG. 11 shows a top sectional view of the mixing module of FIG. 10 seen from above.

The process fluid, leaving the reactive fluid passage 2A through a reactive fluid outlet port 2E, enters a reactive fluid inlet port 3C of a first retention module 3 shown in FIGS. 7-9. Thereto the reactive fluid outlet port 2E and reactive fluid inlet port 3C are externally connected via a tube pipe or the like (not shown). The retention module 3, as the other retention modules 4-6, basically comprises a first plate 3M-6M joined with a second plate 3N-6N by soldering, welding or the like. Between said two plates a passage 3A-6A is provided for accommodating the process fluids during residence time. Thereto a basically sinusoidal flat channel is carved into the contacting surface of the first and/or second plate by etching, milling or the like.

While flowing through said reactive fluid passage 3A, the process fluid is temperature controlled by the two heat exchange modules 7, 8 adjacent to said retention module 3 as described for the temperature adjusting module 1 and mixing module 2 before.

After leaving the first retention module 3 via a reactive fluid outlet port 3D, the reactive fluid enters the subsequent retention modules 4-6 via a respective reactive fluid inlet port connected with the reactive fluid outlet port of a preceding retention module as described before for the reactive fluid inlet port 3C and the reactive fluid outlet port 2E. In this manner the reactive fluid can flow through all subsequent retention modules 4-6 before leaving the micro-reactor system assembly through the last process module's outlet port 6D.

The residence time within each retention module 3-6 is defined by the retention volume, i.e. the section (width× height)×length of the passage 3A-6A accommodating the process fluid, divided by the flow rate. Thus, by providing different widths, lengths, and/or heights of the single passages, different residence times can be obtained. By combining different retention modules with different passage geometries, therefore the residence time can nearly arbitrarily be chosen.

Figure 12:
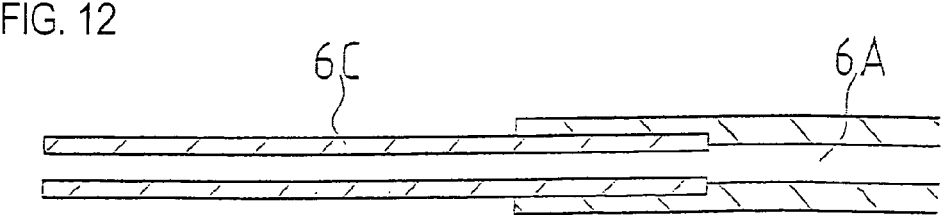
FIG. 12 shows an enlarged view of a reactive fluid inlet port of the mixing module of FIG. 10.

As can be seen from comparison of FIGS. 9 and 12, showing the reactive fluid inlet ports 3C, 6C of the first and fourth retention modules 3 and 6, respectively, the width of the flat channel defining the reactive fluid passages 3A, 6A respectively, can be made smaller (FIG. 9), substantially equal or larger than the width of the reactive fluid inlet port's width.

As shown in FIGS. 1, 2, two tie-rods 13 push first and second frame means 10, 9 towards each other, thereby pressing the stacked heat exchange modules 7, 8 and process modules 1-6 against one another. Placing tie-rods 13 at the circumference of the micro-reactor system assembly and providing a cavity (see FIG. 17) within the centre of the surfaces of the frame means 10, 9 contacting the heat exchange modules 7, 8, a high pressure can be obtained at the circumference of the micro-reactor system assembly. Thus the heat exchange fluid inlet ports 7B, 8B and heat exchange fluid outlet ports 7C, 8C of the heat exchange modules 7, 8, which also are provided at the circumference of the micro-reactor system assembly, are pressed against the heat exchange fluid connection passages 1H-6H in the process modules 1-6 with high pressure. If the heat exchange modules 7, 8 are made from a ductile material like aluminium, copper or an alloy therefrom for example, the circumferential edge of the inlet and outlet port will deform slightly under pressure, thereby providing good sealing against the surface of the process module 1-6 sandwiched in between. Thus the heat exchange fluid outlet port 7C, 8C and heat exchange fluid inlet port 7B, 8B of two subsequent heat exchange modules 7, 8 communicate fluid-thight via the heat exchange fluid connection passage 1H-6H provided in the intermediate process module.

Additionally, there may be provided a ring sealing around the heat exchange fluid inlet ports 7B, 8B and heat exchange fluid outlet ports 7C, 8C. Thereto for example a circular groove may be provided within the first and second plates 7M, 7N, 8M, 8N respectively, accommodating a ring sealing therein (not shown). Such ring sealing may be made from rubber, silicon or—preferably—Teflon or the like.

As can be understood from the foregoing description, a micro-reactor system assembly according to the present invention provides due to its modular structure high flexibility and allows combining different mixing channel geometries with different retention modules, thereby providing arbitrarily chosen residence times, in particular for type B reactions. Each of said process modules 1-6 is temperature controlled by two adjacent heat exchange modules 7, 8. Since heat transfer only is realised by heat conduction through the plates 1M-8M, 1N-8N of the heat exchange modules 7, 8 and process modules 1-6 no sealing or the like is necessary. Furthermore, advantageously the process modules 1-6 may be optimised with respect to the reactants accommodated therein, for example being resistant to corrosion and/or pressure, while at the same time the heat exchange modules 7,8 not coming into contact with the reactants, can be optimised with respect to heat transfer and/or sealing characteristics.

In the embodiment described above heat exchange modules 7, 8 and process modules 1-6 are stacked alternating with one another and the heat exchange fluid flows from a first reservoir through first coupling part 12A in a zigzag line through all heat exchange modules 7, 8 into a second reservoir connected to second coupling part 12B. Thereby all heat exchange fluid connections of the heat exchange modules 7, 8 are internally provided without any additional connections. Advantageously, standardised process and heat exchange modules may be used, thus making it possible to assemble different micro-reactors with different residence time and the like in an easy, modular way.

In the embodiment described above, one temperature adjusting module 1, one mixing module 2 and four retention modules 3-6 have been combined in this order. However, an arbitrary combination of such modules is possible. For example more temperature adjusting modules may be provided to increase the passage in which the reactants are heated up or cooled down. More mixing modules may be provided for a multi-stage reaction. Different retention modules may be provided to realise the required residence time.

With a given flow rate of for example 100 ml/min, a process module's passage length of about 1844 mm, a passage height of 10 mm and a passage width of 0.5-2 mm residence times of 6-22 sec per module have been realised in an example testing. Thus overall residence times of up to 30 min can be realised.

Surprisingly it has turned out that the external connection of subsequent process modules 1-6 does not effect significantly the temperature control of the micro-reactor. Since each process module 1-6, in particular each retention module 3-6, can be very efficiently temperature controlled (heated, cooled or thermal buffered) from two sides, reactions can be run in the micro-reactor within a broad temperature range. As in the example of the described embodiment, preferably one heat exchange module 7, 8 transfers heat from and to subsequent process modules 1-6 (except for the very first and last heat exchange module).

The reactive fluid passages in the process modules 1-6 are micro-structured by etching, milling or the like. Since the heat exchange modules 7, 8 are manufactured separately, they may be manufactured without the micro-structuring, thus reducing costs. Furthermore, since said heat exchange modules 7, 8 do not come into contact with the reactants, they do not need to be resistant to corrosion or high process pressures, thus allowing the use of materials optimised for heat transfer. In particular the following materials may be used for the heat exchange modules.

| Aluminum alloy AlMgSi1 (=EN AW-6082 or EN6082): | | | |
|---|---|---|---|
| EN AW-6082 | EN AW-AlSi1MgMn | AlMgSi1 | DIN 3.2315 |
| EN AW-6061 | EN AW-AlMg1SiCu | AlMg1SiCu | DIN 3.3211 |
| EN AW-6005A | EN AW-AlSiMg(A) | AlMgSi0, 7 | DIN 3.3210 |
| EN AW-6012 | EN AW-AlMgSiPb | AlMgSiPb | DIN 3.0615 |
| EN AW-6060 | EN AW-AlMgSi | AlMgSi0, 5 | DIN 3.3206 |

On the contrary the process modules 1-6 may be made from the following materials for example

| | | |
|---|---|---|
| DIN 1.4571 | AlSl 316 Ti X 10 | CrNiMoTi 18 10 |
| DIN 2.4602 | NiCr21Mo14W | Hastelloy C-22 |
| DIN 2.4610 | NiMo16Cr16Ti | Hastelloy C-4 |
| DIN 2.4617 | NiMo28 | Hastelloy B-2 |
| DIN 2.4819 | NiMo16Cr15W | Hastelloy C-276 |
| DIN 2.4816 | NiCr15Fe | Inconel 600 |
| DIN 2.4856 | NiCr21Mo9Nb | Inconel 625 |
| DIN 2.4858 | NiCr21Mo | Inconel 825 |

The invention claimed is:

1. A micro-reactor system assembly, comprising a stack of:
at least n process modules (1-6), wherein n is an integer equal to or greater than 1, each process module (1-6) being made from a rigid first material and comprising at least one reactive fluid passage (IA, IB, 2A, 3A, 6A) which penetrates said process module (1-6) between at least one reactive fluid inlet port (1C, 1D, 2C, 2D, 3C, 6C) and at least one reactive fluid outlet port (IE, IF, 2E, 3D, 6D), for accommodating and guiding a reactive fluid, wherein in case of at least two process modules (1-6) said at least two process modules (1-6) are connected in series;
and at least n+1 heat exchange modules (7, 8) each of said heat exchange modules (7, 8) being made from a ductile second material other than said first material and comprising at least one heat exchange fluid passage (7A, 8A) which penetrates said heat exchange module (7, 8) between at least one heat exchange fluid inlet port (7B, 8B) and at least one heat exchange fluid outlet port (7C, 8C), for accommodating and guiding a heat exchange fluid, wherein said at least n+1 heat exchange modules (7, 8) are connected in series,
wherein each process module (1-6) is sandwiched between two adjacent heat exchange modules (7, 8).

2. A micro-reactor system assembly according to claim 1, wherein
said first material is resistant to corrosion and pressure and preferably selected from the group consisting of stainless steel, hastelloy, tungsten, tantalum, titanium, ceramics, graphite and/or a suitable combination of one or more of said first materials; and
said second material is heat conducting and preferably is selected from the group consisting of aluminum, aluminum alloys, copper, copper alloys, silver and silver alloys and/or a suitable combination of one or more of said second materials.

3. A micro-reactor system assembly according to claim 1, wherein said at least n process modules (1-6) comprise:
a mixing module (2) the at least one reactive fluid passage (2A) of which comprising a mixing portion (2G) for receiving and mixing at least two reactive fluids;
a thermal adjusting module (1) disposed upstream of said mixing module (2) for adjusting a temperature of said at least two reactive fluids prior to entering said mixing module (2); and
one or more retention modules (3-6) disposed downstream of the mixing module (2) for accommodating the reactive fluid mixture.

4. A micro-reactor system assembly according to claim 1, wherein
said at least one reactive fluid passage (IA, IB, 2A, 3A, 6A) is a flat passage comprising curved and/or straight parts to enable a flow of the respective reactive fluid along a tortuous path, said flat passage preferably has a width/height ratio in the range of 1:4 to 1:50.

5. A micro-reactor according to claim 1, wherein said at least n process modules (1-6) comprise at least two process modules which are externally connected in series.

6. A micro-reactor system assembly according to claim 1, wherein said at least n+1 heat exchange modules (7, 8) comprise:
a first heat exchange module (7) the at least one heat exchange fluid inlet port (7B) of which communicates with a first heat exchange fluid reservoir and the heat exchange fluid outlet port (7C) of which communicates with a succeeding heat exchange module (8);
a second heat exchange module (8) the at least one heat exchange fluid outlet port (8C) of which communicates with a second heat exchange fluid reservoir and the heat exchange fluid inlet port (8B) of which communicates with a preceding heat exchange module (7); and
at least one further heat exchange module disposed between said first heat exchange module (7) and second heat exchange module (8) and connected in series with the first heat exchange module (7) and second heat exchange module (8),
wherein the series connection of two successive heat exchange modules (7, 8) is implemented internally via at least one heat exchange fluid connection passage (IH, 2H, 3H, 6H) passing through a respective one of the at least n process modules (1-6) sandwiched by the two successive heat exchange modules (7, 8).

7. A micro-reactor system assembly according to claim 1, wherein said at least n process modules (1-6) and/or said at least n+1 heat exchange modules (7, 8) comprise each a first plate (IM-8M) and a second plate (IN-8N) permanently joined with one another, wherein each of said reactive fluid passages, heat exchange fluid passages, reactive fluid inlet ports and reactive fluid outlet ports, and/or heat exchange fluid inlet ports and heat exchange fluid outlet ports (IA, IB, 1C-1F, 2A, 2C-2E, 2G, 3A, 3C, 3D, 6A, 6C, 6D, 7A, 8A) is provided between said first plate (IM-8M) and second plate (1M-8M).

8. A micro-reactor system assembly according to claim 7, wherein each of said reactive fluid passages, heat exchange fluid passages, reactive fluid inlet ports and reactive fluid outlet ports, and/or heat exchange fluid inlet ports and heat exchange fluid outlet ports (IA, IB, 1C-1F, 2A, 2C-2E, 2G, 3A, 3C, 3D, 6A, 6C, 6D, 7A, 8A) is obtained by ablating an inner surface of at least one of said first plate (IM-8M) and second plate (IN-8N).

9. A micro-reactor system assembly according to claim 7, wherein a structured intermediate plate (70, 80) is sandwiched between said first plate (7M, 8M) and second plate (7N, 8N) of said at least n+1 heat exchange modules (7, 8) to provide said heat exchange fluid passages (7A, 8A).

10. A micro-reactor system assembly according to claim 1, further comprising:
a first frame means (10); and
a second frame means (9), wherein said at least n process modules (1-6) and said at least n+1 heat exchange modules (7, 8) are pressed against each other by said first and second frame means (9, 10).

11. A micro-reactor system assembly according to claim 6, wherein said ductile second material of said heat exchange modules is plastically deformed by said rigid first material of said process modules in regions surrounding said fluid inlet port and said fluid outlet port to form a substantially fluid-tight seal between adjacent heat exchange and process modules.

* * * * *